United States Patent [19]

Petr

[11] 4,437,087
[45] Mar. 13, 1984

[54] ADAPTIVE DIFFERENTIAL PCM CODING

[75] Inventor: David W. Petr, Red Bank, N.J.

[73] Assignee: Bell Telephone Laboratories, Incorporated, Murray Hill, N.J.

[21] Appl. No.: 343,355

[22] Filed: Jan. 27, 1982

[51] Int. Cl.$^3$ .......................................... H03K 13/01
[52] U.S. Cl. .............................. 340/347 DD; 375/27
[58] Field of Search ............... 340/347 DD, 347 AD, 340/347 DA; 375/27; 332/11 D

[56] References Cited

U.S. PATENT DOCUMENTS

| | | | |
|---|---|---|---|
| 3,631,520 | 12/1971 | Atal | 375/27 |
| 3,931,596 | 1/1976 | Gersho | 332/11 D |
| 3,973,199 | 8/1976 | Widmer | 332/11 D |
| 4,179,710 | 12/1979 | Ishiguro | 375/27 |
| 4,354,273 | 10/1982 | Araseki | 375/27 |

OTHER PUBLICATIONS

"A Training Mode Adaptive Quantizer", by Allen Gersho and David J. Goodman, IEEE Transactions on Information Theory, vol. IT-20, No. 6, Nov. 1974, pp. 746-749.

*Primary Examiner*—C. D. Miller
*Attorney, Agent, or Firm*—John K. Mullarney; Thomas Stafford

[57] ABSTRACT

An ADPCM coder (100) converts a linear PCM input signal representative of PCM encoded speech or voiceband data into a quantized n-bit differential PCM output signal. Samples of the PCM input signal are delivered to a difference circuit (11) along with a signal estimate of the same derived from an adaptive predictor (12). The resultant difference signal is coupled to the input of a dynamic locking quantizer (DLQ). A quantized version of the difference signal is delivered from the output of said quantizer to an algebraic adder (17) where it is algebraically added with the signal estimate. The result of this addition is coupled to the input of the adaptive predictor, which in response thereto serves to generate the next signal estimate for comparison with next PCM sample. The adaptive quantizer has two speeds of adaptation, namely, a fast speed of adaptation when the input linear PCM signal represents speech and a very slow (almost constant) speed of adaptation for PCM encoded voiceband data or tone signals.

The decoder (101) operation is essentially the inverse of the coder, and similarly has two speeds of adaptation.

43 Claims, 6 Drawing Figures

FIG. 5        ENCODER

FIG. 6
DECODER

ADAPTIVE DIFFERENTIAL PCM CODING

TECHNICAL FIELD

The present invention relates to adaptive quantization and prediction in differential PCM coding of speech and voiceband data signals.

BACKGROUND OF THE INVENTION

Over the past several years there has been, and continues to be, a tremendous amount of activity in the area of efficient encoding of speech. A large number of digital coding algorithms are being investigated for a wide variety of applications. For an evolving digital telephone network, a most important application is the possible replacement of 64,000 bit-per-second (bps) PCM signal (8 bits per time slot, repeated at an 8 kHz rate) for telephony—both in the public switched and private line networks. The reasons, of course, is to achieve bandwidth compression. The dilemma for telephony planners is easily posed but not so easily answered—should such a network evolve toward a coding elgorithm more efficient than 64 kb/s PCM and, if so, which algorithm is preferable? A number of different digital coding algorithms and related techniques have been proposed heretofore, namely: Adaptive Differential PCM (ADPCM); Sub-Band Coding (SBC); Time Domain Harmonic Scaling (TDHS); vocoder-driven Adaptive Transform Coding (ATC), etc.

For a realistic mix of input speech and voiceband data, the ADPCM approach appears to be the most promising. Adaptive differential PCM coding is disclosed, for example, in the article by Cummiskey-Jayant-Flanagan (CJF) entitled "Adaptive Quantization in Differential PCM Coding of Speech," *Bell System Technical Journal*, Vol. 52, No. 7, September 1973, pp. 1105-1118. The performance of the CJF-ADPCM algorithm has been well established in previous studies (W. R. Daumer, J. R. Cavanaugh, "A Subjective Comparison of Selected Digital Codecs for Speech", *Bell System Technical Journal*, Vol. 57, No. 9, November 1978, pp. 3119-3165) and can be considered a benchmark since a single encoding with this coder at 32 kb/s is near to being subjectively equivalent to 64 kg/s μto 255 PCM. However, it is not as robust in a tandem encoding situation (see the above referenced Daumer-Cavanaugh article) and it will not handle higher speed voiceband data (e.g., 4800 bps) in a realistic mixed analog/digital network.

SUMMARY OF THE INVENTION

It is a primary object of the present invention to achieve a highly robust, differential PCM coding of voiceband signals, particularly, speech and voiceband data.

The above and other objects are achieved in accordance with the present invention wherein an input sample representing, for example, speech or voiceband data, is delivered to an adder where a predicted signal is subtracted from it. For purpose of illustration, the input sample shell be assumed to be a multi-bit (e.g., 13—16 bits) linear PCM sample. However, the input sample could alternatively be a pulse amplitude modulated (PAM) sample. The predicted signal is an estimate of said input sample derived from an adaptive predictor. The resultant difference signal is coupled to the input of the dynamic locking quantizer of the invention. A quantized version of the difference signal is delivered from the output of said quantizer to another adder wherein it is added to the predicted signal. The result of this latter addition is coupled to the input of the adaptive predictor, which in response thereto serves to generate the next predicted signal for comparison with the next input sample. The quantizer of the invention is an adaptive quantizer that has two speeds of adaptation, namely, a fast speed of adaptation when the input linear PCM signal represents speech and a very slow (almost constant) speed of adaptation for PCM encoded voiceband data or tone signals.

It is a feature that each of the above described functions can be carried out digitally and therefore, a CODEC (coder-decoder) designed in accordance with the invention can be readily implemented in integrated circuit form or, alternatively, through the use of a digital signal processor.

BRIEF DESCRIPTION OF THE DRAWING

The invention will be more fully appreciated from the following detailed description when the same is considered in connection with the accompanying drawings, in which.

DETAILED DESCRIPTION

Figure 1:
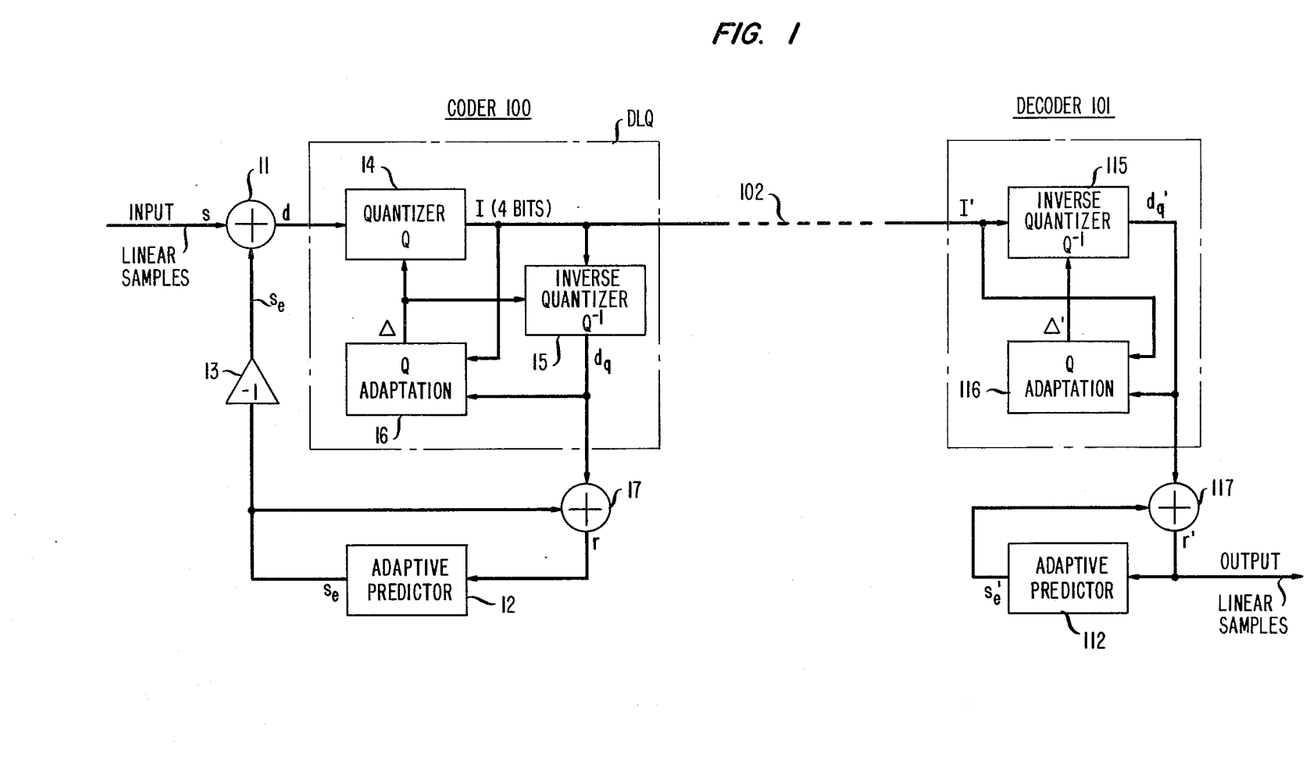
FIG. 1 is a simplified schematic block diagram of an ADPCM CODEC (coder-decoder) in accordance with the present invention.

Turning now to FIG. 1 of the drawings, an ADPCM coder 100, in accordance with the invention, receives input linear PCM samples and encodes the same into an n-bit differential PCM signal for transmission to the ADPCM decoder 101 over the transmission facility 102. For purposes of illustration, a 4-bit differential PCM signal (n=4) shall be assumed. This 4-bit differential signal in conjunction with applicant's ADPCM coding algorithm provides very reliable, robust transmission for both speech and higher speed, voiceband data (e.g., 4800 bps)—as well, of course, for lower speed data and tone signals. However, it is to be understood that the invention is in no way limited to this 4-bit differential transmission and n could be any other number, e.g., n=2, n=3, n=5, etc. If the input linear samples were always representative of encoded speech, then a 2-bit differential PCM signal (i.e., n=2) should prove adequate for many applications.

The multi-bit (e.g. 13-16 bits) linear PCM samples s are delivered to an algebraic adder or difference circuit 11. As previously mentioned, the samples s could also be PAM samples. The linear PCM samples may result from the direct encoding of an input speech signal or voiceband data to linear PCM. Alternatively, an input 8-bit μ-law encoded signal may first be converted to its multi-bit linear counterpart. And, of course, other non-uniform signals such as an A-law signal may also first have to be converted to its linear PCM counterpart.

Such conversions are known in the art and comprise no part of the present invention.

An adaptive predictor 12, to be described in detail hereinafter, provides a predicted signal $s_e$ which is a prediction or an estimate of the sample s. This predicted signal $s_e$ is inverted in inverter 13 and delivered to the other input of the adder circuit 11. As the name implies, the latter circuit provides at its output a difference signal d that is the algebraic addition of the two inputs thereto. The difference signal d is coupled to the input of the dynamic locking quantizer (DLQ) of the invention. The DLQ comprises a 16 level (for n=4) non-uniform quantizer 14 of scale factor $\Delta$. As will be appreciated by those in the art, the quantizer 14 not only provides the desired quantization, but it also serves to PCM encode the input signal; the quantizing and encoding are carried out in one-and-the-same operation (see any standard digital transmission text). The 4-bit output signal I represents the quantized and PCM encoded form of the difference sample d.

The 4-bit PCM output is delivered to the $Q^{-1}$ inverse quantizer 15 which, as the designation implies, performs an operation that is essentially the inverse of the operation of block 14. That is, the inverse quantizer 15 receives the 4-bit differential PCM signal I and provides at its output the signal $d_q$. This $d_q$ signal is the quantized version of the difference signal d. The signal $d_q$ is coupled to the input of the Q adaptation circuit 16 and to the adder 17. The $s_e$ output of the adaptive predictor 12 is also coupled to an input of the adder 17. The adder 17 serves to add these two input signals so as to provide at its output the reconstructed signal r, which is a close quantized version of the input signal s. The signal sample r is delivered to the adaptive predictor 12, which in response thereto serves to generate the next predicted signal for comparison with the next linear PCM sample. The adaptive predictor 12, to be described in detail hereinafter, uses the sample r and a few previous samples to arrive at a prediction $s_e$ which is the weighted sum of m input samples (e.g., m=4).

The Q adaptation circuit 16 receives the quantized difference signal $d_q$ and the 4-bit output I and serves to develop therefrom the adaptive scale factor $\Delta$. This scale factor $\Delta$ is then delivered to the quantizer 14 and to the inverse quantizer 15. The adaptive scale factor $\Delta$ serves to scale the Q and $Q^{-1}$ characteristics to match the power of the input difference signal d. The Q adaptation circuit of the invention controls the speed of adaptation of the scale factor $\Delta$; a fast speed of adaptations is provided when the input linear PCM signal represents speech, with a very slow (almost constant) speed of adaptation for input PCM encoded voiceband data or tones.

The 4-bit differential PCM signal is transmitted, in typical time-division multiplexed fashion, over the digital transmission facility 102 and is delivered to the input of the $Q^{-1}$ inverse quantizer 115. This input signal is designated I', the prime indicating that it is close to and yet, perhaps, not identical with the signal I due to transmission errors. Similarly, the other letter symbols used in the decoder 101 are primed to indicate that they are close to but perhaps not identical with the similarly designated symbols or signals of the coder 100. The $Q^{-1}$ quantizer 115 is identical to the $Q^{-1}$ quantizer 15 and it serves to provide at its output the quantized signal $d_q'$. Again, as before, $d_q'$ represents the quantized version of the difference signal d, with the prime indicating a possible variation therefrom due to transmission errors. The quantized signal $d_q'$ is coupled to the input of the Q adaptation circuit 116 and the adder 117. The input differential PCM signal I' is also coupled to the input of the Q adaptation circuit 116; this circuit is identical to the Q adaptation circuit 16 of the coder (100). The output of the Q adaptation circuit 116 is the adaptive scale factor $\Delta'$ which is delivered to the $Q^{-1}$ quantizer 115 for the same purpose as previously described. The adaptive predictor 112 serves to generate the predicted signal $s_e'$ which is coupled to the other input of the adder 117. The adaptive predictor 112 is identical to the adaptive predictor 12 of the coder 100. The adder 117 serves to digitally add the two input signals to produce the reconstructed signal r' which is a close quantized version of the original input signal s. The signal r' is delivered to the input of the adaptive predictor 112, and to the output where it is utilized to reconstruct a replica of the original input speech or voiceband data signal.

Figure 2:
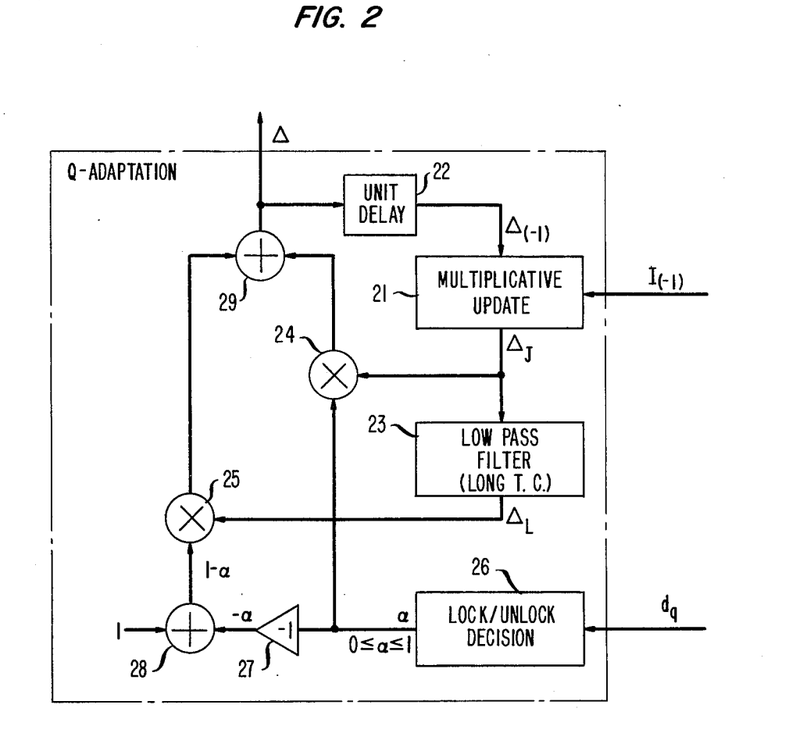
FIG. 2 is a schematic block diagram of the Q-Adaptation block(s) of FIG. 1.

The Q adaptation circuit of the present invention is shown in greater detail in FIG. 2 of the drawings. The last PCM output $I_{(-1)}$ is coupled to a robust, multiplicative update circuit 21, as is the last scale factor $\Delta_{(-1)}$. The $\Delta_{(-1)}$ signal is provided via the unit delay 22. The output of the update circuit 21 is the scale factor signal $\Delta_J$. The function of this update circuit can be described as follows:

$$\Delta_J = \Delta_{(-1)}^\beta \cdot M(I_{(-1)}) \tag{1}$$

That is, the scale factor $\Delta_J$ is given by the previous scale factor $\Delta_{(-1)}$ raised to the power $\beta$ multiplied by a time-invariant function of the code-word $I_{(-1)}$. This, of course, is somewhat similar to, and yet different from, the update function utilized in the CJF-ADPCM coder.

Beta ($\beta$) is a number which is very close to one (e.g., 63/64). The $\beta$ function introduces finite memory into the adaptation process so as to reduce the effect of transmission errors. The $M(I_{(-1)})$ function is chosen such that $\Delta_J$ is larger than $\Delta_{(-1)}$ when the PCM code-word $I_{(-1)}$ has a large magnitude, and $\Delta_J$ is smaller than $\Delta_{(-1)}$ when the PCM code-word $I_{(-1)}$ has a small magnitude. Thus, for example, when $I_{(-1)}$ represents the largest step of the quantizer, $M(I_{(-1)})$ is some number greater than one, such as 2, and when $I_{(-1)}$ represents the smallest step of the quantizer, $M(I_{(-1)})$ could be some number less than one, such as 0.9. Accordingly, and as will be obvious to those skilled in the art, the adaptive variable, $\Delta_J$ will expectedly vary quite rapidly, this being desirable for input speech signals. The $M(I_{(-1)})$ function can be stored in a read-only-memory (ROM) and then be accessed in response to the value of $I_{(-1)}$. And the $\Delta^\beta$ can be implemented, for example, using conventional logarithmic transformation techniques or, in a DSP enviroment, by a piece-wise linear approximation approach. These two functions [$\Delta_{(-1)}^\beta$ and $M(I_{(-1)})$] are then multiplied to obtain $\Delta_J$.

The $\Delta_J$ signal is coupled to the single pole, digital, low-pass filter 23 which has a long-time constant (e.g., 150 ms.). The effect of this is to smooth out the more rapid changes in $\Delta_J$ so that the filter output $\Delta_L$ changes very slowly, which is desirable for input voiceband data. The $\Delta_J$ output is delivered to the multiplier 24 and the $\Delta_L$ output is coupled to the multiplier 25. The other input to multiplier 24 is the adaptive parameter $\alpha$ derived from the lock/unlock decision circuit 26 whose input is the quantized difference signal $d_q$. The decision circuit 26, to be described in detail hereinafter, provides an output signal $\alpha$ which approaches one when the original input signal s represents speech, and results in an output $\alpha$ approaching 0 for input voiceband data. The signal $\alpha$ is inverted in inverter 27. It is then added in adder circuit 28 so as to provide the output signal $1-\alpha$ which is then coupled to the multiplier 25. The output of the multipliers 24 and 25 are both coupled to the adder 29 which in turn provides the scale factor signal $\Delta$.

To summarize the above, for a speech signal input, $\alpha$ generally approaches one and thus the scale factor $\Delta$ is close to the scale factor $\Delta_J$ which varies rapidly with speech input; whereas, for voiceband input data, the variable parameter $\alpha$ approaches 0 and, therefore, the scale factor $\Delta$ approximates the scale factor $\Delta_L$ which is nearly constant. The adaptive parameter $\alpha$ provides a smooth transition when the scale factor $\Delta$ is changed from $\Delta_J$ to $\Delta_L$ and visa versa; this smooth transition is necessary to minimize the effect of transmission errors between the encoder and the decoder which might ensue if such a smooth transition did not take place.

Figure 3:
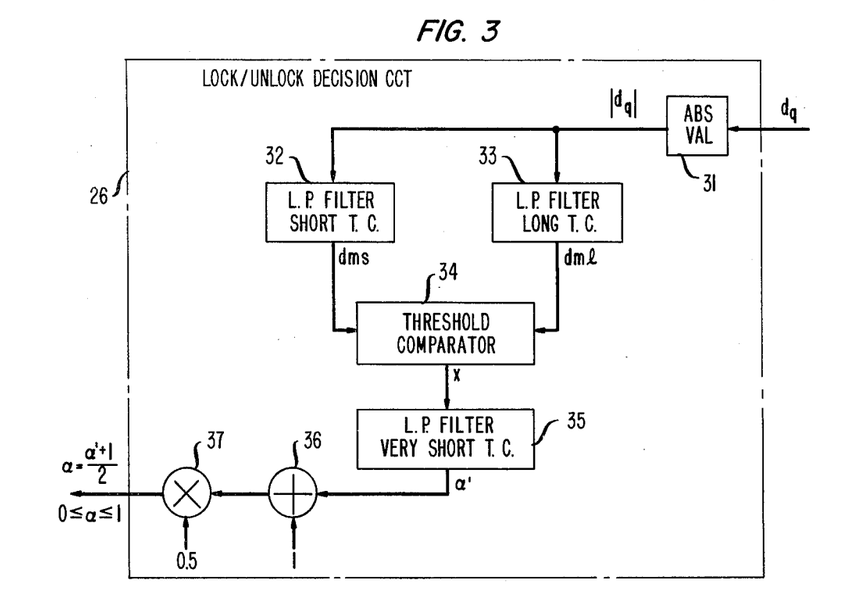
FIG. 3 is a schematic block diagram of the Lock/Unlock Decision block of FIG. 2.

The adaptive parameter $\alpha$ is derived from, or developed by, the decision circuit 26 illustrated in detail in FIG. 3. The quantized difference signal $d_q$ is delivered to the "absolute value" circuit 31 whose output $|d_q|$ is an absolute value irrespective of the sign of the input signal. The $|d_q|$ signal is coupled to the input of the single pole, digital, low-pass filters 32 and 33. The filter 32 has a short time constant (e.g., 10 msec.) and the filter 33 has a long time constant (e.g., 150 msec.). The dms signal from filter 32 represents the difference (signal) magnitude for the short term; that is, it is the short term average of the magnitude of $d_q$. The dml signal from filter 33 represents the difference (signal) magnitude over a relatively long term; i.e., it is the long term average of the magnitude of $d_q$. The dms of the dml signals are delivered to the threshold comparator 34. As the name implies, the latter circuit compares the two inputs thereto to produce the output variable x. The variable x is of only one of two values, either a plus one or a minus one; that is, $x=+1$ or $x=-1$. If dms and dml are fairly close—for example, if they fall within a threshold value T of each other—then $x=-1$; whereas, if they differ by more than this threshold value T, then $x=+1$. The function of the threshold comparator 34 can be best described mathematically, as follows:

If $(1-T)\cdot dml < dms < (1+T)\cdot dml$
then $x=-1$
otherwise $x=+1$
And, e.g., $T \simeq 0.125$ If the short and long term magnitudes of the input signal $d_q$ are "tracking", it is reasonable to assume an input signal of more or less constant statistical properties such as voiceband data; in this case, therefore, $x=-1$. Whereas, if the short and long term magnitudes of the input signal d differ considerably, it is reasonable to assume an input signal of quickly changing statistical properties such as speech and then $x=-1$.

The signal x is delivered to the low-pass, single-pole, digital, filter 35 which has a very short time constant (e.g., 5 msec.). The output of the filter 35 ($\alpha'$) is a variable between the range of minus one and plus one ($-1 \leq \alpha' \leq 1$). This output $\alpha'$ represents the exponentially weighted average of the input signal x. The addition operation of adder 36 and the multiplication operation of multiplier 37 produce the adaptive parameter $\alpha(\alpha = (\alpha' + 1/2)$, where, $0 \leq \alpha' \leq 1$.

To summarize the circuit operation, when the input signal $d_q$ represents voiceband data samples, $dms \simeq dml$ and $x=-1$, $\alpha'$ thus approaches $-1$ and therefore $\alpha$ approaches 0; and as a consequence, the scale factor $\Delta \simeq \Delta_L$. Alternatively, when the input signal $d_q$ represents speech samples $dms \neq dml$ and $x=+1$, $\alpha'$ approaches $+1$ and, therefore, $\alpha$ approaches 1; and as a result, the scale factor $\Delta \simeq \Delta_J$.

Figure 4:
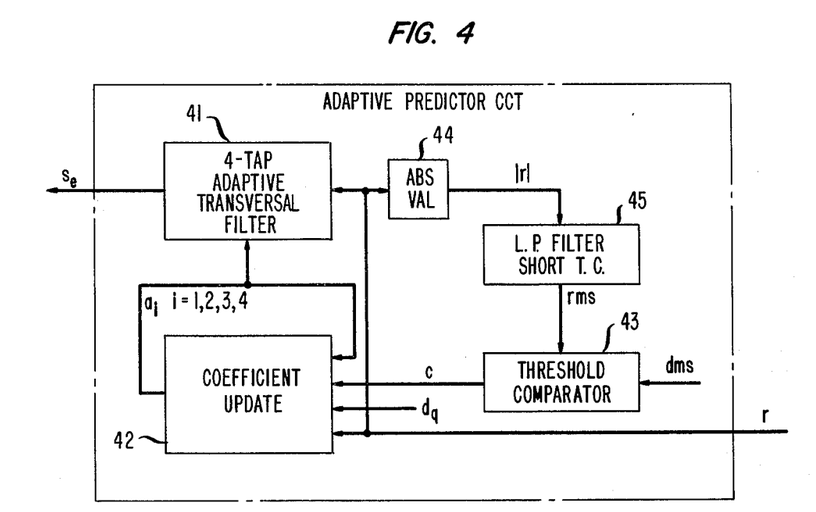
FIG. 4 is a schematic diagram of the adaptive predictor(s) of FIG. 1.

The adaptive predictor(s) circuit of FIG. 1 is shown in greater detail in FIG. 4. The reconstructed signal r (or r') is coupled to the input of the adaptive transversal filter 41, which for purposes of illustration shall be assumed to be a four-tap transversal filter, and to the input of the coefficient update circuit 42. The transversal filter 41 is of conventional design and its output $s_e$ is equal to the sum of the coefficients $a_i$ multiplied by past samples of the reconstructed signal r:

$$s_e = \sum_{i=1}^{4} a_i \cdot r_{(-i)} \tag{2}$$

The transversal filter 41, therefore, is assumed to comprise four-taps and thus four prior samples of r are multiplied by coefficient $a_i$, where $i=1, 2, 3, 4$. The signal (s) $a_i$ are provided by coefficient update circuit 42. This latter circuit is a simplified form of the gradiant adaptation algorithm which is a known technique for driving an adaptive transversal filter. The update circuit 42 has four inputs. The first is the reconstructed siganl r, another is its own output signal $a_i$, a third input is the signal c derived from the threshold comparator 43, and the final one is the $d_q$ signal from $Q^{-1}$ quantizer 15.

The reconstructed signal r is also coupled to the absolute value circuit 44 whose output $|r|$ is an absolute value irrespective of the sign of the input signal. The $|r|$ signal is delivered to the input of the single-pole, digital, low-pass filter 45 of short time constant, e.g., 10 msec. The rms signal from filter 45 represents the reconstructed (signal) magnitude for the short term; that is, it is the short term average of the magnitude of r. The filter 45 output is compared in the threshold comparator 43 with the dms signal, previously described. As the name implies, the latter circuit compares the two inputs thereto to produce the variable c. The variable c is of only one of two values, $c=c_1$, or $c=c_2$ where $c_1 > c_2$. The function of the threshold comparator 43 can best be described mathematically as follows:

If $dms > T_2 \cdot rms$
then, $c=c_1$
otherwise, $c=c_2$
where, for example, $c_1=2^{-7}$, $c_2=2^{-9}$, $T_2=0.25$.

Given, the four described input signals to the coefficient update circuit 42, its function can be described mathematically as follows:

$$a_i = 1^i \cdot a_{i(-1)} + c \cdot \text{sgn}(d_q) \cdot \text{sgn}(r_{(-i)}) \tag{3}$$

for $i=1, 2, 3, 4$.
and, for example, $1=0.998$.

The output $a_i$ is derived by multiplying the last $a_i$ by the constant 1 raised to the power i, and the result of this multiplication is then added to the variable c multiplied by both the sign of the signal $d_q$ and the sign of the signal $r_{(-i)}$. As will be obvious to those in the art, these operations comprise straightforward multiplication and algebraic addition. The variable c in the foregoing equation (2) controls the speed of adaptation of the predictor, with $c_2$ offering a lower speed of adaptation which is particularly useful for input tone signals. The constant $l(l<1)$ introduces finite memory into the adaptation process so as to reduce the effect of transmission errors. Further, and as will be evident to those skilled in the art, this adaptive predictor is of a relatively simple and yet a quite reliable design. It is a particularly advantageous aspect of the quantizer of the invention that it permits one to use this simple yet highly efficient adaptive predictor design. However, the invention is not limited in its use to this particular adaptive predictor design. For example, any of the adaptive predictor structures and adaptation techniques disclosed in the article by Jerry D. Gibson entitled, "Adaptive Prediction in Speech Differential Encoding Systems", *Proceedings of the IEEE*, Vol. 68, No. 4, April 1980, pages 488–525, can be used to advantage.

Figure 5:
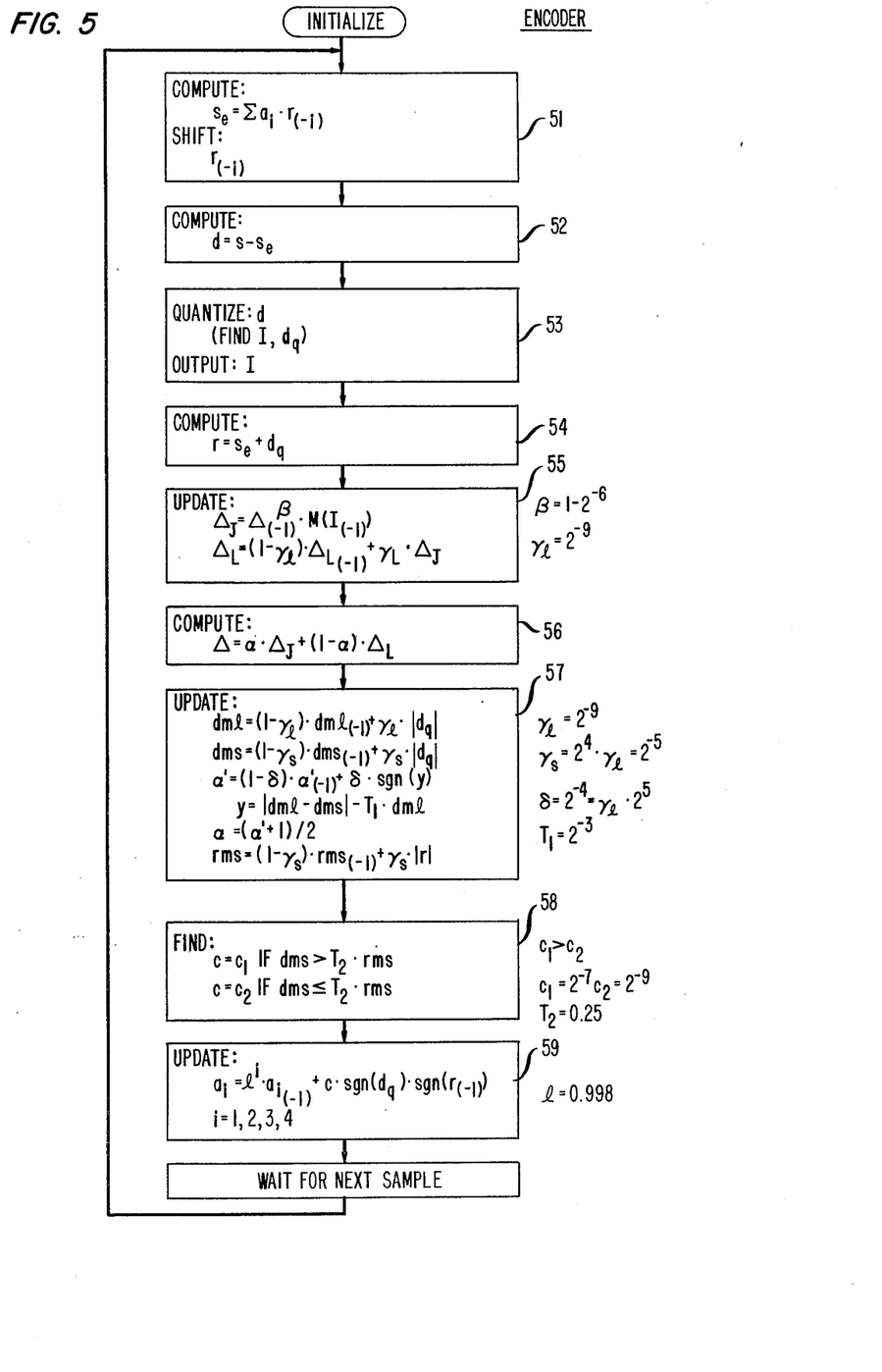
FIG. 5 is a flow chart that is descriptive of the operation of the ADPCM coder of the invention.

The coding algorithm is depicted in the flowchart in FIG. 5 of the drawings. The enumerated blocks of this figure represent steps in the coding procedure. After initialization, the signal estimate $s_e$ is computed 51, by the transversal filter 41 in the manner previously described, and the reconstructed signal $r_{(-i)}$ is shifted; that is, the r samples are shifted in the delay line of the transversal filter 41. The next step 52 of the coding algorithm is to compute the difference signal d, which comprises the algebraic addition of the two inputs to adder 11. The difference signal d is then quantized, the 4-bit PCM output I is formed and from the latter the quantized version of d (i.e., $d_q$) is developed—this comprises step 53 of the algorithm. In step 54 of the algorithm, the reconstructed signal r is computed or formed by adder 17. The update step 55 serves to update the scale factor signals $\Delta_f$ and $\Delta_L$; the equation for $\Delta_f$ is, of course, the equation (1) given above. The equation for $\Delta_L$ is the mathematical representation of the low pass filter 23 function. Example values for the constant parameters of the two equations of block 55 are shown outside and to the right of the block. The constant $\gamma_1$ determines the time constant of the low pass filter 23. Using the most recent parameter, $\alpha$, the scale factor $\Delta$ is computed in the next step 56 in accordance with the described operation of the circuit of FIG. 2. Having generated new values for $d_q$ and r, the parameters, dml, dms, $\alpha'$, $\alpha$ and rms are then updated in accordance with the appropriate equations shown in block 57; once again, example values for the constant parameters of these equations are shown outside, but adjacent to block 57. As before, the equations for dml, dms, $\alpha'$, and rms are the mathematical representations of the digital, low-pass, single pole, filters of FIGS. 3 and 4. Using the dms and rms values, the threshold comparator 43 finds or determines the appropriate value for the variable c in accordance with the equations given in block or step 58. Lastly, the values of $a_i$ are updated by coefficient update circuit 42 (step 59). Once this step is completed, the coder waits for the next input sample and the entire process is repeated once again, as indicated in FIG. 5. As will be appreciated by those skilled in the art, the flow chart of FIG. 5 is not intended to depict an exacting sequence of events; for example, some of the steps may occur at essentially the same time. As will be further understood, if the invention is implemented through the use of a programmable, digital signal processor, the sequence of steps may, of course, be different.

Figure 6:
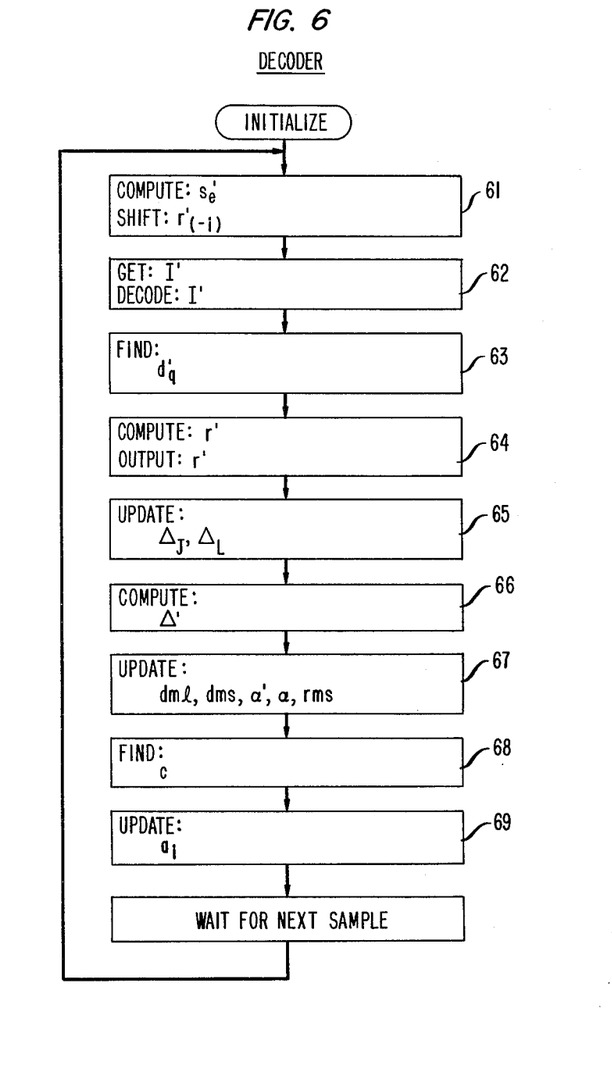
FIG. 6 is a flow chart that is descriptive of the operation of the ADPCM decoder of the invention.

The decoding algorithm is shown in the flow chart of FIG. 6. The enumerated blocks of FIG. 6 represent the steps in this decoding procedure. After initialization, the signal estimate $s_e'$ is computed 61, in the adaptive predictor 112, and the reconstructed signal $r'_{(-i)}$ is shifted in the delay line of the transversal filter of predictor 112. Step 62 relates to the reception and decoding of the 4-bit differential PCM signal I', followed by the generation or "finding" of the quantized version of the difference signal, $d_q'$ (step 63). The remaining steps 64 through 69 find their equivalent in the steps 54 through 59, respectively, of FIG. 5. Accordingly, a repetition of the mathematical equations used in FIG. 5 does not appear to be warranted; the equations for the steps 64 through 69 are the same as the equations shown for steps 54 through 59. Following step 69, the decoder waits for the next received sample and the entire process is repeated, as indicated in FIG. 6. As with FIG. 5, the flow chart of FIG. 6 is not intended to depict an exacting sequence of events; some of the steps may occur at essentially the same time. And, if the invention is implemented through the use of a programmable, digital signal processor, the sequence of steps may, of course, be different.

Various modifications of the disclosed ADPCM system and coding algorithm should be readily apparent at this point. For example, the transversal filter 41 may comprise more or less than 4-taps (3, 5, 6, ...). Further, the invention is in no way limited to any particular non-uniform quantizer; in fact, some applications could call for a uniform quantizer. The time constants of the low-pass filters can be readily changed, as can the threshold values $T_1$ and $T_2$ and any of the other constant parameters, as the system designer deems appropriate for a given system application. Lastly, the ADPCM system has been disclosed in terms of two speeds of adaptation, namely, a fast speed of adaptation when the input linear PCM signal represents speech and a very slow speed of adaptation for PCM encoded voiceband data and tone signals. However, it is entirely within the principles of the present invention to provide an ADPCM system which offers three speeds of adaptation, namely, a very fast speed, an intermediate speed, and an extremely slow speed of adaptation. Without further belaboring the point, it should be obvious at this time that the above described arrangement is merely illustrative of the application and of the principles of the present invention, and numerous modifications thereof may be devised by those skilled in the art without departing from the spirit and scope of the invention.

What is claimed is:

1. A coder (100) for converting a linear input signal representative of encoded speech, voiceband data or tone signals into a quantized differential PCM output signal, the input signal being coupled to the input of a difference circuit (11) along with a signal estimate of said input signal to obtain a difference signal indicative of the difference therebetween, a predictor means (12) for producing said signal estimate, an adaptive quantizing means (DLQ) for receiving said difference signal and providing at its output a quantized version of the difference signal, and means (17) for adding said quantized version of the difference signal with said signal estimate and coupling the sum to the input of said predictor means, said adaptive quantizing means being characterized by, means (FIG. 2) for dynamically controlling said adaptive quantizing means speed of adaptation including, means for producing a fast speed of adaptation when the input signal represents speech signals and a slow speed of adaptation when the input signal represents encoded voiceband data or tone signals.

2. A coder as defined in claim 1 wherein the means (FIGS. 2-24, 25, 29) for producing the fast and slow adaptation speeds further provides for smooth transitions between the speeds.

3. A coder as defined in claim 2 wherein the predictor means (FIG. 4) is adaptive, with a slow speed of adaptation when the input PCM signal represents tone signals.

4. A coder as defined in claim 2 wherein finite memory (band l) is introduced into the adaptation processes to reduce the effect of transmission errors.

5. A coder as defined in claim 2 wherein said quantizing means comprises a non-uniform quantizer.

6. A coder as defined in claim 2 wherein n-bit differential PCM encoding is carried out concurrently with the quantization of the difference signal.

7. A coder as defined in claim 6 wherein $n=4$.

8. A decoder (101) for converting a quantized n-bit differential PCM input signal (I') representative of encoded speech, voiceband data or tone signals into a linear output signal (r') comprising inverse adaptive quantizer means (115) for receiving said input signal and providing at its output a quantized version of the original difference signal that was encoded into said n-bit differential PCM signal, said decoder being characterized by, means (116) coupled to the input and to the output of said inverse adaptive quantizer means and for dynamically controlling the adaptive inverse quantizer means to achieve a fast speed of adaptation when the differential PCM input signal represents speech signals and a slow speed of adaptation when the differential PCM input signal represents voiceband data or tone signals.

9. A decoder as defined in claim 8 wherein the means (FIG. 2) for controlling the two speeds of adaptation further provides for smooth transistions between said speeds.

10. A decoder as defined in claim 9 including predictor means (112) for producing a signal estimate of the original PCM encoded speech, voiceband data or tone signals, means (117) for algebraically adding said quantizer version of said difference signal and said signal estimate to generate the linear output signal (r'), and means for coupling the linear output signal (r') of the adding means to the input of said predictor means and to the output of the decoder.

11. A decoder as defined in claim 10 wherein the predictor means (112) is adaptive, with a slow speed of adaptation when the input differential PCM signal represents tone signals.

12. A decoder as defined in claim 9 wherein finite memory (band l) is introduced into the adaptation processes to reduce the effect of transmission errors.

13. A decoder as defined in claim 9 wherein the said inverse adaptive quantizer means possesses a nonlinear characteristic.

14. A decoder as defined in claim 9 wherein $n=4$.

15. An adaptive differential PCM (ADPCM) coder (100) for converting a linear PCM input signal representative of PCM encoded speech, voiceband data or tone signals into a quantized differential PCM output signal comprising a difference circuit (11) to which samples of the PCM input signal and a signal estimate of the same are coupled, said difference circuit providing an output difference signal indicative of the difference between the two inputs thereto, a predictor means (12) for producing said signal estimate, adaptive quantizing means (DLQ) for receiving said difference signal and providing at its output a quantized version of the difference signal, and means (17) for adding said quantized version of the difference signal with said signal estimate to generate a reconstructed signal version of the PCM input signal, the reconstructed signal output of the adding means being coupled to the input of the predictor means which in response thereto serves to generate the next signal estimate for comparison with the next PCM sample, and means for dynamically controlling said adaptive quantizing means speed of adaptation, said controlling means including means for producing a fast speed of adaptation when the PCM input signal represents speech signals and a very slow speed of adaptation when the PCM input signal represents PCM encoded voice data or tone signals.

16. An ADPCM coder as defined in claim 15 wherein the means (FIGS. 2-24, 25, 29) for producing the fast and slow adaptation speeds further provides for smooth transitions between the speeds.

17. An ADPCM coder as defined in claim 16 wherein the predictor means (FIG. 4) is adaptive, with a lower speed of adaptation when the input PCM signal represents tone signals.

18. An ADPCM coder as defined in claim 16 wherein finite memory (band l) is introduced into the adaptation processes to reduce the effect of transmission errors.

19. An ADPCM coder as defined in claim 16 wherein said quantizing means comprises a non-uniform quantizer.

20. An ADPCM coder as defined in claim 16 wherein an n-bit differential PCM encoding is carried out concurrently with the quantization of the difference signal.

21. An ADPCM coder as defined in claim 20 wherein $n=4$.

22. An adaptive differential PCM (ADPCM) decoder (101) for converting a quantized n-bit differential PCM input signal (I') representative of PCM encoded speech, voiceband data or tone signals into a linear PCM output signal (r') comprising inverse adaptive quantizer means (115) for receiving said input signal and providing at its output a quantized version of the original difference signal that was encoded into said n-bit differential PCM signal, and means (116) receiving the differential PCM input signal and said quantized version of the difference signal and controlling the adaptive quantizer means to achieve a fast speed of adaptation when the differential PCM input signal represents speech and a slow speed of adaptation when the differential PCM input signal represents voiceband data or tone signals.

23. A decoder as defined in claim 22 wherein the means (FIG. 2) for controlling the two speeds of adaptation further provides for smooth transitions between said speeds.

24. A decoder as defined in claim 23 including predictor means (112) for producing a signal estimate of the original PCM encoded speech or voiceband data, means (117) for algebraically adding said quantized version and said signal estimate, and means for coupling the output of the adding means to the input of said predictor means and to the output of the decoder.

25. A decoder as defined in claim 24 wherein the predictor means (112) is adaptive, with a lower speed of adaptation when the input differential PCM signal represents tone signals.

26. A decoder as defined in claim 23 wherein finite memory (band 1) is introduced into the adaptation processes to reduce the effect of transmission errors.

27. A decoder as defined in claim 23 wherein the said quantizer means possesses a non-uniform characteristic.

28. A decoder as defined in claim 23 wherein n=4.

29. In a digital transmission system, an adaptive differential PCM coder (100) for converting a linear PCM input signal representative of PCM encoded speech, voiceband data or tone signals into a quantized n-bit differential PCM output signal (I) comprising a difference circuit (11) to which samples of the PCM input signal and a signal estimate of the same are coupled, said difference circuit providing an output difference signal indicative of the difference between the two inputs thereto, a predictor means (12) for producing said signal estimate, adaptive quantizing means (DLQ) for receiving said difference signal and providing at its output a quantized version of the difference signal, means (17) for adding said quantized version of the difference signal with said signal estimate to generate a reconstructed version of said PCM input signal, the reconstructed signal output of the adding means being coupled to the input of the predictor means which in response thereto serves to generate the next signal estimate for comparison with the next PCM sample, said quantizing means having a fast speed of adaptation when the PCM input signal represents speech and a very slow speed of adaptation when the PCM input signal represents PCM encoded voiceband data or tone signals with smooth transitions between the two speeds, said quantizing means serving to carry out an n-bit differential PCM encoding concurrently with the quantization of the difference signal; means for transmitting the n-bit differential PCM output signal to a remote decoder over a time-division multiplexed transmission facility; and an adaptive differential PCM decoder (101) for converting a received, quantized, n-bit differential PCM input signal (I'), representation of differential PCM encoded speech, voiceband data or tone signals into a linear PCM output signal (r') comprising inverse adaptive quantizer means (115) for receiving said input signal and providing at its output a quantized version of the original difference signal that was encoded into said n-bit differential PCM signal, means (116) receiving the differential PCM input signal and said quantized version of the difference signal and controlling the adaptive inverse quantizer means to achieve a fast speed of adaptation when the differential PCM input signal represents speech and a slow speed of adaptation when the differential PCM input signal represents voiceband data or tone signals with smooth transitions between the two speeds, predictor means (112) for producing a signal estimate of the original PCM encoded speech or voiceband data, means (117) for algebraically adding said quantized version and said signal estimate to generate the linear PCM output signal, and means for coupling the linear PCM output signal of the adding means to the input of said predictor means and to the output of the decoder.

30. A coding method for converting a linear PCM input signal representative of PCM encoded speech, voiceband data or tone signals into a quantized n-bit differential PCM output signal comprising the steps of, forming a signal estimate of said PCM input signal, algebraically adding said PCM input signal and said signal estimate to obtain a difference signal indicative of the difference therebetween, adaptively quantizing and encoding said difference signal to provide a quantized n-bit differential PCM output signal and a quantized version of the difference signal, adding the quantized version of the difference signal to said signal estimate to generate a reconstructed signal version of said PCM input signal, the reconstructed PCM input signal being used to form the next signal estimate, and dynamically controlling the adaptive quantizing speed of adaptation so that a fast speed of adaptation is achieved when the PCM input signal represents PCM encoded speech signals and a slow speed of adaptation is achieved when the PCM input signal represents encoded voiceband data or tone signals.

31. A coding method as defined in claim 30 wherein transitions between the two speeds of adaptation are achieved smoothly.

32. A decoding method for converting a quantized n-bit differential PCM input signal representative of PCM encoded speech, voiceband data or tone signals into a linear PCM output signal comprising the steps of, adaptively inverse quantizing and decoding said differential PCM input signal to provide a quantized version of the original difference signal that was encoded into said n-bit differential PCM signal, dynamically controlling the adaptive quantizing speed of adaptation so that a fast speed of adaptation is achieved when the differential PCM input signal represents speech signals and a slow speed of adaptation is achieved when the PCM input signal represents voiceband data or tone signals, forming a signal estimate of the original PCM encoded speech or voiceband data, algebraically adding said quantized version of the difference signal and said signal estimate to generate a reconstructed linear PCM output signal, said reconstructed linear PCM output signal of the adding step being used to generate a new signal estimate, and delivering the reconstructed linear PCM output signal to an output terminal.

33. A decoding method as defined in claim 32 wherein transitions between the two speeds of adaptation are achieved smoothly.

34. An ADPCM coder (100) for converting a linear PCM input signal representative of PCM encoded speech or voiceband data into a quantized n-bit differential PCM output signal comprising a difference circuit (11) to which samples of the PCM input signal and a signal estimate of the same are coupled, said difference circuit providing an output difference signal indicative of the difference between the two inputs thereto, a predictor means (12) for producing said signal estimate, adaptive quantizing means (14, 15) for receiving said difference signal and providing at its output an n-bit differential PCM code word and a quantized version of the difference signal, means (17) for adding said quantized version of the difference signal with said signal estimate, the output of the adding means being coupled to the input of the predictor means which in response thereto serves to generate the next signal estimate for comparison with the next PCM sample, and means (FIG. 2) operative in response to said n-bit differential code word and said quantized version of the difference signal to control said quantizing means to produce a nearly constant speed of adaptation for PCM encoded voiceband data and a fast speed of adaptation with an adaptive scale factor ($\Delta_j$) given by the equation $\Delta_J = \Delta_{(-1)}{}^\beta \cdot M(I_{(-1)})$, where $\Delta_{(-1)}$ is the preceding adaptive scale factor, $\beta$ is a number close to one, and $M(I_{(-1)})$ is a time-invariant function of the preceding n-bit differential code word.

35. An ADPCM coder as defined in claim 34 wherein $\beta$ is approximately 63/64.

36. An ADPCM coder as defined in claim 34 wherein the $M(I_{(-1)})$ function is chosen such that $\Delta_J$ is larger than $\Delta_{(-1)}$ when the preceding PCM code word $I_{(-1)}$ has a large magnitude and $\Delta_J$ is smaller than $\Delta_{(-1)}$ when the PCM code word $I_{(-1)}$ has a small magnitude.

37. An ADPCM coder as defined in claim 34 wherein the adaptive scale factor $\Delta_J$ is delivered to a long-time constant low-pass filter (23) to derive an adaptive scale factor ($\Delta_L$) desirable for PCM encoded voiceband data.

38. An ADPCM coder as defined in claim 37 wherein the low-pass filter has a time constant of substantially 150 milliseconds.

39. An ADPCM decoder (101) for converting a quanized n-bit differential PCM input signal (I') representative of PCM encoded speech or voiceband data into a linear PCM output signal (r') comprising inverse adaptive quantizer means (115) for receiving said input signal and providing at its output a quantized version of the original difference signal that was encoded into said n-bit differential PCM signal, and means (116) receiving the PCM input signal and said quantized version of the difference signal and controlling the adaptive quantizer means to achieve a nearly constant speed of adaptation for PCM encoded voiceband data and a fast speed of adaptation with an adaptive scale factor ($\Delta_J$) given by the equation $\Delta_J = \Delta_{(-1)}^\beta \cdot M(I_{(-1)})$, where $\Delta_{(-1)}$ is the preceding adaptive scale factor, $\beta$ is a number close to one, and $M(I_{(-1)})$ is a time-invariant function of the preceding n-bit differential code word.

40. An ADPCM decoder as defined in claim 39 wherein $\beta$ is approximately 63/64.

41. An ADPCM decoder as defined in claim 39 wherein the $M(I_{(-1)})$ function is chosen such that $\Delta_J$ is larger than $\Delta_{(-1)}$ when the preceding PCM code word has a large magnitude and $\Delta_J$ is smaller than $\Delta_{(-1)}$ when the preceding PCM code word has a small magnitude.

42. An ADPCM decoder as defined in claim 39 wherein the adaptive scale factor $\Delta_J$ is delivered to a long-time constant low-pass filter (23) to derive an adaptive scale factor ($\Delta_L$) desirable for PCM encoded voiceband data.

43. An ADPCM decoder as defined in claim 42 wherein the low-pass filter has a time constant of substantially 150 milliseconds.

* * * * *